United States Patent

[11] 3,575,079

| [72] | Inventor | Howard John Leonard Smith |
| --- | --- | --- |
| | | Farnham, Surrey, England |
| [21] | Appl. No. | 836,914 |
| [22] | Filed | June 26, 1969 |
| [45] | Patented | Apr. 13, 1971 |
| [73] | Assignee | Dzus Fastener Co., Inc. |
| | | West Islip, N.Y. |
| [32] | Priority | June 28, 1968 |
| [33] | | Great Britain |
| [31] | | 31060/68 |

[54] QUICK RELEASE FASTENER
3 Claims, 6 Drawing Figs.

[52] U.S. Cl. .................................................. 85/5, 24/221
[51] Int. Cl. ................................................ F16b 19/00
[50] Field of Search .......................................... 85/5.2, 5, (Plastic Digest), 36; 24/221 (L), (K), 221, 221.2; 151/7, 19 (A)

[56] References Cited
UNITED STATES PATENTS

| 3,220,078 | 11/1965 | Preziosi | 85/5X |
| --- | --- | --- | --- |
| 3,272,061 | 9/1966 | Seckerson | 85/5X |
| 3,298,350 | 1/1967 | Mundschenk | 24/221X |
| 3,327,581 | 6/1967 | Schlueter | 85/5 |
| 3,344,488 | 10/1967 | Texier | 24/221 |

*Primary Examiner*—Ramon S. Britts
*Attorney*—Daniel H. Kane

ABSTRACT: A fastener comprises two members which are both moulded from resilient plastics material. One of the members is a stud having a cylindrical shank with a head at one end, a flat at the other end and a notch spaced away from the other end and intersecting the flat. The other member is a retaining member having a socket with a retaining web extending across a portion of the socket. To assemble the fastener the shank is inserted into the socket with the flat accommodating the web. The stud is then turned relatively to the retaining member so that the web in the socket is received in the notch in a locked position of the two members. The base of the notch intersects the flat at an acute angle so that an edge portion of the flat is undercut and the undercut edge portion is deformed by the web as the stud is turned until a dead center position is reached whereafter the stud snaps into the locked position. The stud may be formed as a bolt and the retaining member as a nut.

Patented April 13, 1971 3,575,079

Inventor
Howard John Leonard Smith
By Daniel H. Kane
Attorney

QUICK RELEASE FASTENER

This invention relates to a quick release fastener which is suitable for releasably holding together two flat pieces of material each formed with a hole through which a part of the fastener passes.

In accordance with the invention a fastener comprises two members which are both moulded from resilient plastics material and of which one is stud with a head and a cylindrical shank and the other is formed with a cylindrical socket and a retaining web extending across part of the socket, the shank having a free end formed with both a flat to enable the shank to pass the retaining web upon insertion of the free end into the socket and, spaced away from the free end, a notch which intersects the flat and which is arranged in use to receive the web upon relative rotation between the two members and to prevent withdrawal of the shank, the web interfering with the intersection of the flat and notch during the relative rotation so that the two members are held in their locked position.

The notch may have a flat base except in the region of the intersection with the flat where the base of the notch preferably extends outwards to meet the flat at an acute angle. In effect this undercuts the edge of the flat adjacent to the notch and, if the geometry of the flat, the notch and the retaining web is suitably chosen, the undercut edge of the flat is deformed by the web as the stud is turned relatively to the socket until a dead center position is reached whereafter the stud snaps into the position in which the web is received in the notch.

A secure fastening can be achieved with one securing web and one cooperating flat and associated notch. It is possible however to have two webs in the socket each cooperating with a corresponding flat and notch on the stud.

The member in which the socket is formed can be arranged to be attached to one of the pieces to be joined in any convenient way such as riveting. Alternatively the two pieces to be joined can simply be formed with holes, the stud and the socket member being separate and being used as a bolt and nut. The head of the stud and the socket member may then both be noncircular.

One example of a fastener according to the invention is a nut and bolt for use in a toy construction set and is illustrated in the accompanying drawings in which.

Figure 1:
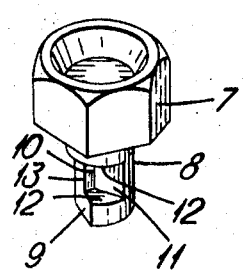
FIG. 1 is a perspective view of the bolt.

The bolt in FIG. 1 is moulded from polyethylene and has a hexagonal head 7 and a shank 8. The shank is formed with a flat 9 and a notch 10 which has a base 11, two end faces 12 and a side face 13.

Figure 2:
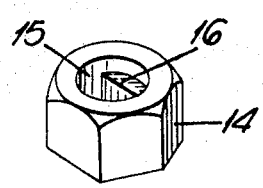
FIG. 2 is a perspective view of the nut.

A nut 14 shown in FIG. 2 has a hole 15, forming a socket, of circular cross section. An integral web 16 is shaped as a minor segment of the circular cross section of the hole.

Figure 4:
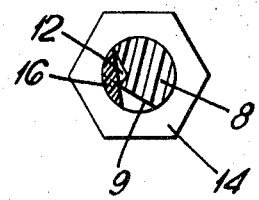
FIG. 4 is a view similar to FIG. 3 except that the nut and bolt are locked together by relative rotation.
Figure 3:
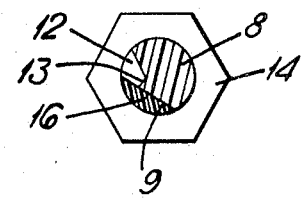
FIG. 3 is an underneath plan with parts in section of the nut and bolt together.
Figure 5:
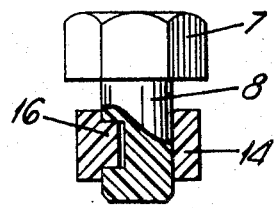
FIG. 5 is an elevation with parts in section of a nut and bolt locked together as in FIG. 4.

To fasten the nut and bolt together, the shank of the bolt is inserted into the hole 15 in the nut and the nut is turned so that the web 16 slides over the flat 9 as illustrated in FIG. 3. The nut is then turned to the position shown in FIGS. 4 and 5 with the web 16 in the notch 10 and trapped between the two end faces 12 of the notch.

The side face 13 of the notch meets the flat 9 at an acute angle which has the effect of undercutting the edge of the flat. As the nut is turned from the position shown in FIG. 3 the undercut edge is deformed as the widest part of the web 16 passes until a dead center position is reached. Further turning of the nut to the position shown in FIGS. 4 and 5 allows the undercut edge to return to its natural shape causing the nut to snap into the position shown in FIG. 4 and remain there.

Figure 6:
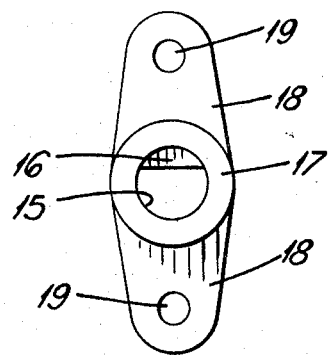
FIG. 6 illustrates an alternative to the nut.

An alternative retaining member to the nut is illustrated in FIG. 6 and has a hole 15 and a web 16 similar to those of the nut 14. Instead of having a hexagonal exterior the retaining member has two wings 18 each formed with a hole 19 for a rivet. It is used with a stud similar to that shown in FIG. 1.

I claim:

1. A fastener comprising a stud member moulded from plastics material having a cylindrical shank, a head at one end of said shank, a flat formed at the other end of said shank, and a notch spaced away from said other end and intersecting said flat, and a retaining member moulded from plastics material having a socket and a retaining web extending across a portion of said socket, said retaining member being adapted to receive said other end of said shank of said stud member with said retaining web accommodated by said flat, subsequent relative rotation between said stud member and said retaining member to a locked position of said members causing said web to be received in said notch, (and said web being adapted to interfere with the intersection between said flat and said notch during said relative rotation whereby said members are held in said locked position.) said notch having a base surface comprising two relatively inclined portions, one of said portions being remote from said intersection with said flat and being inclined at an obtuse angle to said flat and the other of said portions being close to said intersection and being inclined at an acute angle to said flat whereby an edge portion of said flat adjacent to said intersection is undercut and is deformed by said web as said stud member is turned relatively to said retaining member until a dead center position is reached whereafter said stud snaps into said locked position.

2. A fastener according to claim 1, wherein said retaining member has two mounting wings and a hole formed in each wing.

3. A fastener according to claim 1, wherein said stud member is in the form of a bolt, said head being of noncircular configuration, and said retaining member is in the form of a nut.